United States Patent
Butsuen et al.

[11] Patent Number: 5,203,584
[45] Date of Patent: Apr. 20, 1993

[54] SUSPENSION SYSTEM FOR A VEHICLE

[75] Inventors: Tetsuro Butsuen; Hiroshi Uchida; Tohru Yoshioka; Yasunori Yamamoto; Shinichiro Yamashita, all of Hiroshima, Japan

[73] Assignee: Mazada Motor Croporation, Japan

[21] Appl. No.: 686,794

[22] Filed: Apr. 17, 1991

[30] Foreign Application Priority Data

Apr. 17, 1990 [JP] Japan .................. 2-101082
Apr. 24, 1990 [JP] Japan .................. 2-109452

[51] Int. Cl.$^5$ ............................ B60G 11/26
[52] U.S. Cl. .................... 280/707; 280/709; 364/424.05
[58] Field of Search .......... 280/703, 707, 709; 364/424.05; 188/299

[56] References Cited
U.S. PATENT DOCUMENTS

| | | | |
|---|---|---|---|
| 4,624,476 | 11/1986 | Tanaka et al. | 280/707 |
| 4,741,554 | 5/1988 | Okamoto | 280/703 |
| 5,044,660 | 9/1991 | Yamamura et al. | 280/707 |
| 5,069,476 | 12/1991 | Tsutsumi et al. | 280/707 |
| 5,072,965 | 12/1991 | Wada et al. | 280/707 |

FOREIGN PATENT DOCUMENTS

60-248419 12/1985 Japan .
61-163011 7/1986 Japan .

Primary Examiner—Joseph E. Valenza
Assistant Examiner—Tuan N. Nguyen
Attorney, Agent, or Firm—Thompson, Hine and Flory

[57] ABSTRACT

A suspension system of a vehicle which judges the direction of a damping force of a shock absorber of damping force characteristic variable type, provided between the sprung member and the unsprung member, either oscillation-stimulating direction or oscillation-restraining direction with respect to vertical osciallation of the sprung member, and it also judges the size of the damping force of the shock absorber. The damping force characteristic of the shock absorber is set higher when it is larger than the predetermined value and it is set lower when it is less than the predetemined value. The predetermined value can be changed according to the road surface, oscillation-restraining energy becomes larger than the oscillation-stimulating energy thereby. Therefore, improvement of the comfortableness to ride in and running stability can be planned and also, noise and oscillation caused by unnecessary changes of the damping force characteristic of the shock absorber in a high oscillation frequency range due to road bumps can be reduced.

8 Claims, 10 Drawing Sheets

SUSPENSION SYSTEM FOR A VEHICLE

BACKGROUND OF THE INVENTION

This invention relates to a suspension system for a vehicle and more particularly to a suspension system which comprises a shock absorber of damping force characteristic variable type provided between a sprung member and an unsprung member.

In general, the vehicle suspension system comprises a shock absorber, for damping the oscillation of a wheel, interposed between a sprung member and an unsprung member. There are various types of shock absorbers and shock absorbers of damping force characteristic variable type are grouped into one which damping force characteristic (characteristic of different damping coefficient) is changed into two levels (higher level and lower level) and the another which the damping force characteristic is changed into many levels or changed steplessly.

The basic function of the shock absorber of damping force characteristic variable type is that the damping force characteristic of a shock absorber is set lower (i.e., SOFT side) when the damping force generated by a shock absorber acts in the oscillation-stimulating direction (in the same vertical direction as a sprung member) and the damping force is set higher (i.e., HARD side) when the damping force acts in the oscillation-restraining direction (in the opposite vertical direction to the sprung member) so that oscillation-restraining energy is set larger than oscillation-stimulating energy. Thus, comfortableness to ride in and running stability is improved.

Various methods for judging in which direction the damping force of a shock absorber is acting, either in the oscillation-stimulating direction or oscillation-restraining direction with respect to the sprung member, are proposed. Fir example, the Japanese Patent Application Laying Open Gazette No. 60-248419 discloses a method that judges a direction of a damping force in such a way: the sign of relative displacement between the sprung member and the unsprung member is checked whether it is same as a sign of differentiated value of it, which is relative speed between the sprung member and the unsprung member. If signs are same, it is observed that damping force is acting in the oscillation-stimulating direction and if signs are not same, it is observed that damping force is acting in the oscillation-restraining direction. Also, the Japanese Patent Application Laying Open Gazette No. 61-163011 discloses a method, in which a sign of absolute speed of the sprung member is checked whether it is same as a sign of relative speed between the sprung member and the unsprung member. If signs are same, it is observed that damping force is acting in the oscillation-restraining direction and if signs are not same, it is observed that damping force is acting in the oscillation-stimulating direction.

However, when the sprung member is in a high oscillation frequency range due to bounce and recession of a road, the sign of relative displacement between the sprung member and the unsprung member, the sign of relative speed between the sprung member and the unsprung member, and the sign of absolute speed of the sprung member change constantly. Therefore, conventional control method possesses problems such as loud noise or oscillation caused by unnecessary switching of the damping force characteristic of the shock absorber.

Also, when the damping force characteristic of each shock absorber is switched to higher level, the oscillation of the unsprung member caused by the bounce and recession on a road is transmitted to the sprung member easily and accordingly, a passenger feel unsmooth and uncomfortable ride.

SUMMARY OF THE INVENTION

The object of the present invention is to provide a suspension system which eliminates the noise and oscillation and improves the comfortableness for a passenger to ride in by restricting unnecessary switching of damping force characteristic of a shock absorber to higher level during high oscillation frequency of the sprung member due to the road vibration, in case that the damping force characteristic of the shock absorber is changed by judging in which the direction of the damping force of the shock absorber is acting, either oscillation-stimulating direction or oscillation-restraining direction with respect to the vertical oscillation of the sprung member.

In order to achieve the above object, the suspension system for a vehicle has hereinafter described construction.

The suspension system for a vehicle comprises a shock absorber of damping force characteristic variable type interposed between the sprung member and the unsprung member, a judging means for judging in which direction the damping force of the shock absorber is acting, either in the oscillation-stimulating direction or the oscillation-restraining direction, a control means for changing the damping force characteristic of the shock absorber to be higher if that value of the judging means is more than a predetermined value and to be lower if that value of the judging means is equal to or less than the predetermined value, and a predetermined value changing means for changing the predetermined value according to the road surface.

By the above construction, the damping force characteristic of the shock absorber is changed to be higher if the damping force is more than the predetermined value and to be lower if the damping force is equal to or less than the predetermined value. Thus, the oscillation-stimulating energy becomes larger than the oscillation compensating energy. Furthermore, the predetermined value is changed by the predetermined value changing means according to the road surface. For example, when the predetermined value is changed to be high where the sprung member is at high oscillation frequency due to bounce and recession of a road, the damping force characteristic of the shock absorber is hardly changed to be higher and therefore, noise and oscillation caused by the unnecessary changes of the damping force characteristic is prevented.

The above and further objects and advantages of the present invention will be apparent by reading the following description with reference to the accompanying drawings.

DESCRIPTION OF THE DRAWINGS

Accompanying drawings show preferred embodiments of the present invention, in which:

FIGS. 1–7 show a first embodiment, of which

DESCRIPTION OF THE PREFERRED EMBODIMENT

The preferred embodiment is described below with reference to the accompanying drawings.

Figure 1:
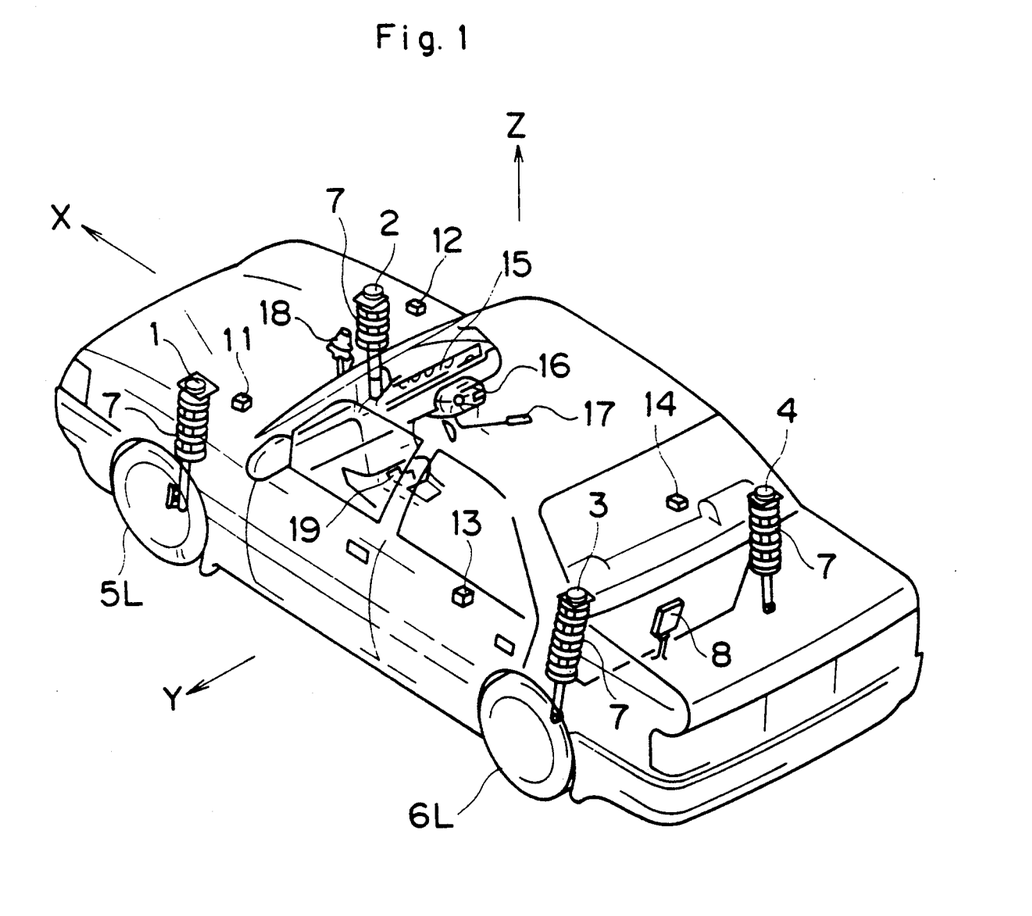
FIG. 1 is a perspective view showing layout of components of a suspension system.

FIG. 1 shows a layout of components of a suspension system. In FIG. 1, reference numerals 1~4 designate four shock absorbers, for damping the oscillation of wheels, provided in right and left front wheels (only left front wheel 5L is shown in the drawings) and right and left rear wheels (only left rear wheel 6L is shown in the drawings). Each shock absorber 1~4 has an actuator 25 (refer to FIG. 2) for switching damping force characteristic of a shock absorber to either higher level or lower level and a vehicle height sensor (not shown in the drawings) for detecting relative displacement between a sprung member and an unsprung member. Reference numeral 7 designates a coil spring provided at outer circumference of each shock absorber 1~4 at their upper part, and reference numeral 8 designates a control unit for controlling the damping force variably by receiving a signal from the above vehicle height sensor of each shock absorber 1~4 and outputting a signal to the actuator provided in each shock absorber 1~4.

Reference numerals 11~14 designate four acceleration sensors for detecting acceleration in the vertical direction (Z direction) of the sprung member of a wheel, 15 designates a vehicle speed sensor for detecting a vehicle speed provided in a meter of an instrument panel, 16 designates a steering angle sensor for detecting a steering angle of the front wheels by the rotation of the steering shaft, 17 designates an accelerator opening sensor for detecting an opening of an accelerator, 18 designates a brake pressure switch for checking whether the brake is under operation (i.e., whether the vehicle is braking) on the basis of the brake fluid pressure, and 19 designates a mode selecting switch by which a driver switches the damping force characteristics of the shock absorbers 1~4 to either HARD, SOFT, or CONTROL. Those sensors 11~17 and switches 18 and 19 output signals to the control unit 8.

Figure 2A:
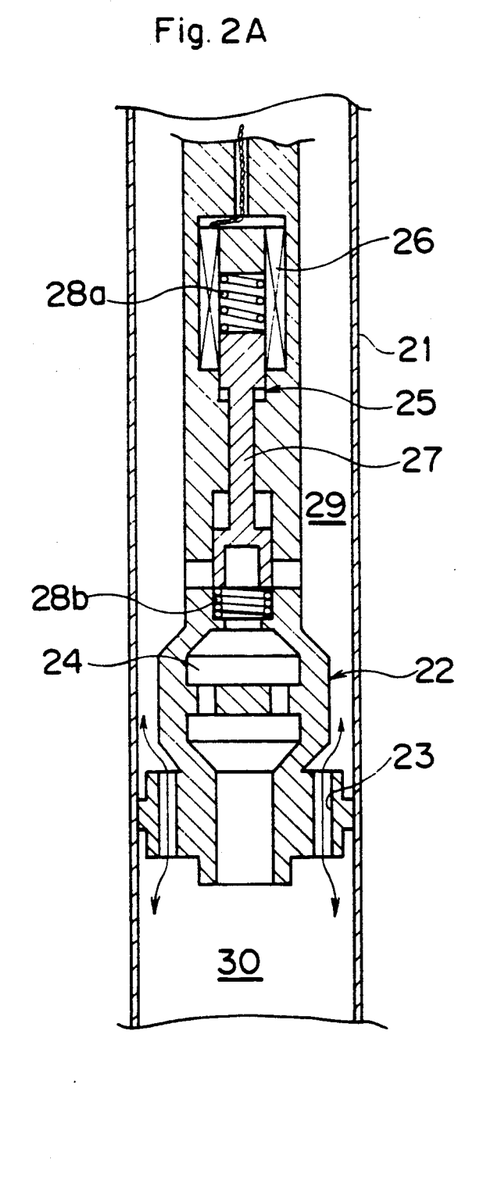
FIG. 2 is a vertical sectional view of a main part of a shock absorber.
Figure 2B:
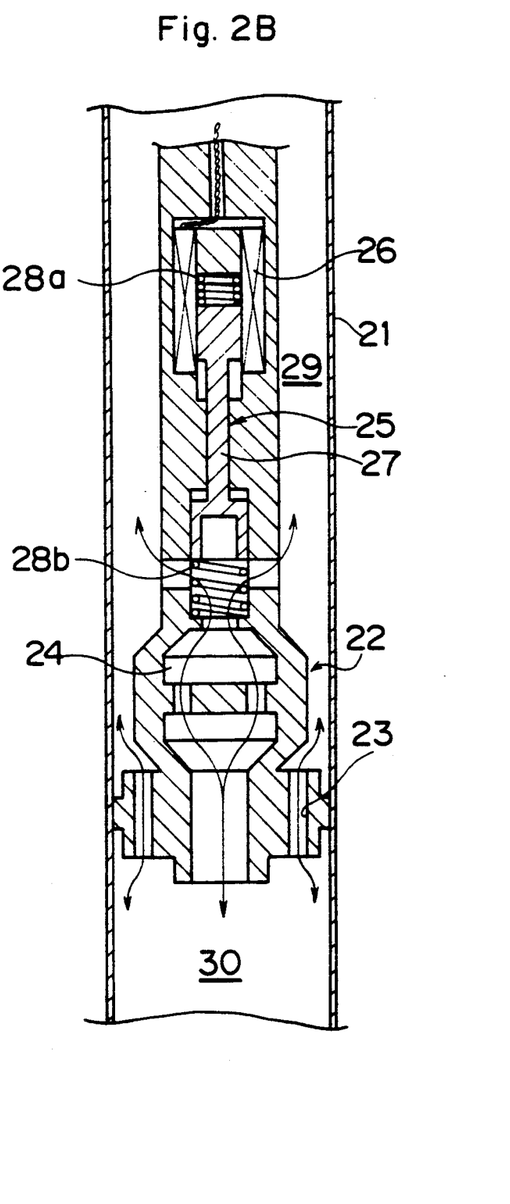

FIGS. 2A and 2B show the construction of each shock absorber 1~4, where FIG. 2A is illustrating a case that the damping force characteristic of each shock absorber 1~4 is HARD (high damping force is generated) and FIG. 2B is illustrating a case that the damping force characteristic of each shock absorber 1~4 is SOFT (low damping force is generated). The vehicle height sensor in each shock absorber 1~4 is not shown in this drawing.

In FIG. 2, reference numeral 21 designates a cylinder, a piston unit 22 formed by a piston and a piston rod is inserted slidably therein. The cylinder 21 and the piston unit 22 are mounted to the axle (unsprung member) or a vehicle body (sprung member) through each joint.

Two orifices 23, 24 are provided in the piston unit 22. The one orifice 23 is open at all times, and the another orifice 24 is openable/closable by an actuator 25. The actuator 25 is consisted of a solenoid 26, a control rod 27, and two springs 28a, 28b. The control rod 27 slides vertically in the piston unit 22 by magnetic force from the solenoid 26 and force from the both springs 28a, 28b so that the orifice 24 is opened/closed.

An upper chamber 29 and a lower chamber 30 in the cylinder 21 and a hollow part, for communicating with both chambers, provided in the piston unit 22 are filled with fluid having adequate viscosity. This fluid can flow between the upper chamber 29 and the lower chamber 30 through either orifice 23 or 24.

The explanation is made below about the action of each shock absorber 1-4.

When the solenoid 26 is not electrified, the control rod 27 is pushed downwardly since the force of the spring 28a, which acts on the control rod 27 to push it downwardly, is set larger than the force of the spring 28b, which acts on the control rod 27 to push it upwardly, then the orifice 24 is closed (refer to FIG. 2A). Therefore, the fluid can flow only through the orifice 23 and the damping force characteristic of each shock absorber 1~4 is set HARD (higher damping force).

When the solenoid 26 is electrified, the control rod 27 is pushed upwardly by the magnetic force of the solenoid 26, then the orifice 24 is opened (refer to FIG. 2B). Therefore, the fluid can flow through both orifices 23, 24 and the damping force characteristic of each shock absorber 1~4 is set SOFT (lower damping force). As described above, since the damping force characteristic of each shock absorber 1~4 is HARD when the solenoid 26 is not electrified, each shock absorber 1~4 is kept HARD even if the control unit 8 is in trouble and worsening steering stability is prevented.

Figure 3:
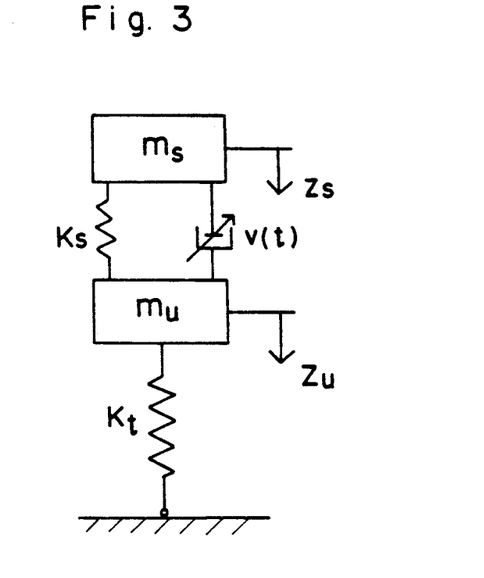
FIG. 3 is a diagram illustrating oscillation of a suspension system.

FIG. 3 shows the oscillation model of the suspension system, where ms designates sprung mass, mu designates unsprung mass, zs designates displacement of the sprung member, zu designates displacement of the unsprung member, ks designates a spring constant of a coil spring 7, kt designates a spring constant of a tire, and v(t) designates a damping coefficient of a shock absorber.

Figure 4:
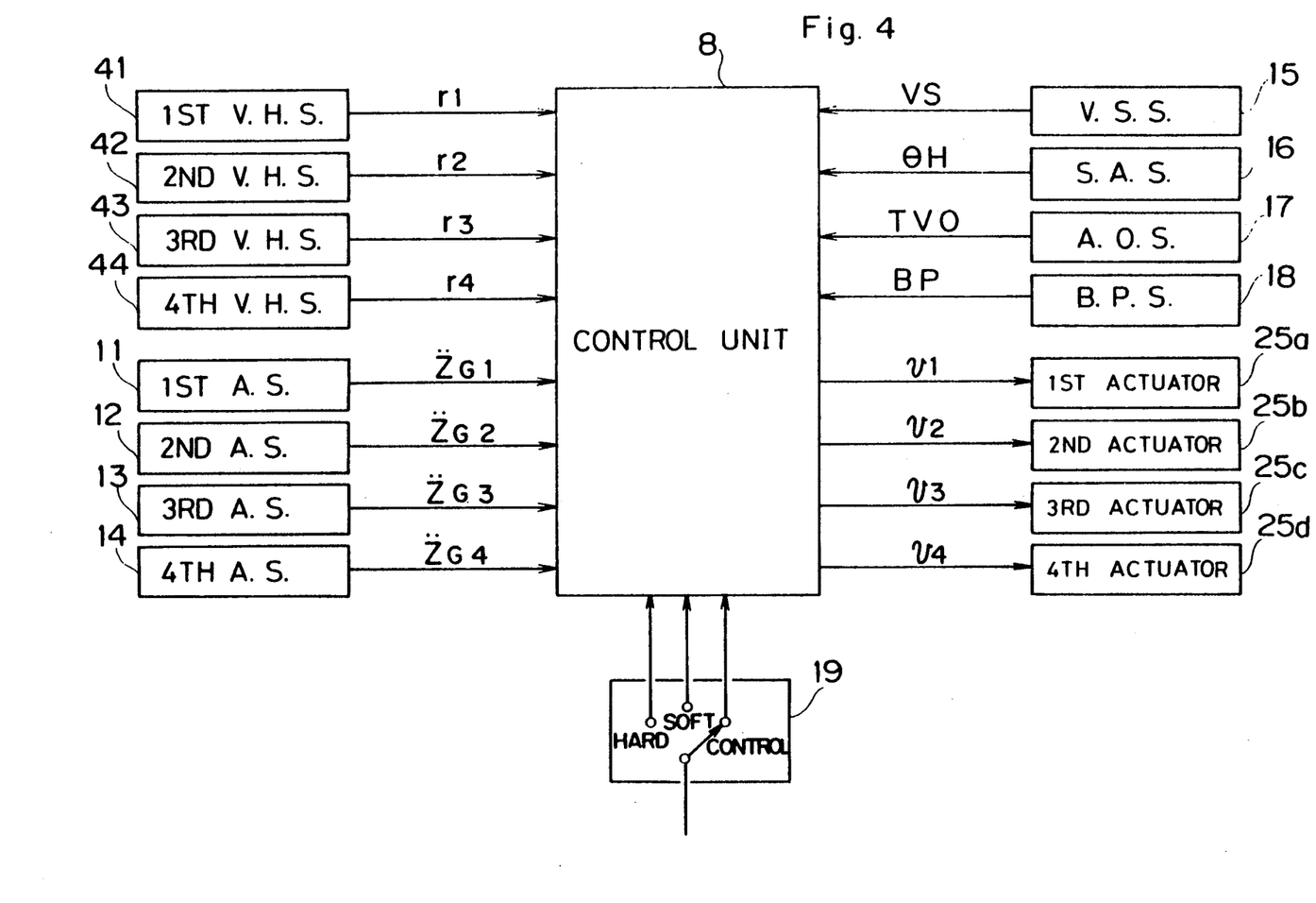
FIG. 4 is a block diagram illustrating a control part of a suspension system.

FIG. 4 shows the block diagram of a control part of the suspension system. In FIG. 4, a first set of a vehicle height sensor 41, an acceleration sensor 11, and an actuator 25a corresponds to a front left wheel 5L, so as a second set of a vehicle height sensor 42, an acceleration sensor 12, and an actuator 25b corresponds to a front right wheel, a third set of a vehicle height sensor 43, an acceleration sensor 13, and an actuator 25c corresponds to a rear left wheel 6L, and a forth set of a vehicle height sensor 44, an acceleration sensor 14, and actuator 25d corresponds to a rear right wheel. The actuators 25a~25d are identical with the actuator 25 of FIG. 2 and the vehicle height sensors 41~44 are provided in each shock absorber 1-4.

Also, in the drawing, r1~r4 designates signals of relative displacement between the sprung member and the unsprung member outputted to the control unit 8 from the first~forth vehicle height sensors 41~44, and those signals take continuous numbers. When each shock absorber 1~4 extends, the signal is positive and when each shock absorber 1~4 is compressed, the signal is negative. The relative displacement is presented by the deviation from the relative displacement where a vehicle is not moving, which is defined 0, (i.e., zs−zu, the difference between zs which is the displacement of the sprung member and zu which is the displacement of the unsprung member as shown in FIG. 3).

Signals $\ddot{z}_G1 \sim \ddot{z}_G4$, vertical (Z direction) absolute acceleration of the sprung member, are outputted to the control unit 8 from the first∼forth acceleration sensors 11∼14, and those signals take continuous numbers. When the sprung member receives the upward acceleration, the signal is positive and when the sprung member receives the downward acceleration, the signal is negative.

Vehicle speed signal VS, steering angle signal $\theta$H, accelerator opening signal TVO are outputted to the control unit 8 from a vehicle speed sensor 15, a steering angle sensor 16, and an accelerator opening sensor 17 respectively. Those signals take continuous numbers. The vehicle speed signal VS is positive when the vehicle moves forwardly and it is negative when the vehicle moves rearwardly. The steering angle signal $\theta$H is positive when a steering wheel turns to counterclockwise from a driver (i.e., turning to the left), and it is negative when the steering wheel turns to clockwise (i.e., turning to the right).

Brake pressure signal BP is outputted to the control unit 8 from a brake pressure switch 18, and the signal has two alternatives, ON or OFF. "On" means that the brake is under operation and "OFF" means that the brake is not under operation.

Actuator control signals v1∼v4 are outputted to the actuaters 25a∼25d from the control unit 8, and those signals have two alternatives, [1] or [0]. When it is [1] (refer to FIG. 2), the solenoid 26 of the actuator 25 is not electrified and the damping force characteristic of each shock absorber 1∼4 is HARD. When it is [0], the solenoid 26 of the actuator 25 is electrifed and the damping force characteristic of each shock absorber 1∼4 is SOFT.

Moreover, mode selecting signal is outputted to the control unit 8 from the mode selecting switch 19, this signal is a parallel signal and takes either HARD, SOFT, or CONTROL in the present invention. "HARD" means that a driver selects HARD mode, so as SOFT means that a driver selects SOFT mode, and CONTROL means that the a driver selects CONTROL mode. As it will be described later, when HARD mode is selected, the damping force characteristic of all shock absorbers 1∼4 is set HARD, and when SOFT mode is selected, the damping force of all shock absorbers 1∼4 is set SOFT. However, when CONTROL mode is selected, the damping force characteristic of each shock absorber 1∼4 is switched to either HARD or SOFT according to the driving condition and the road surface.

Figure 5:
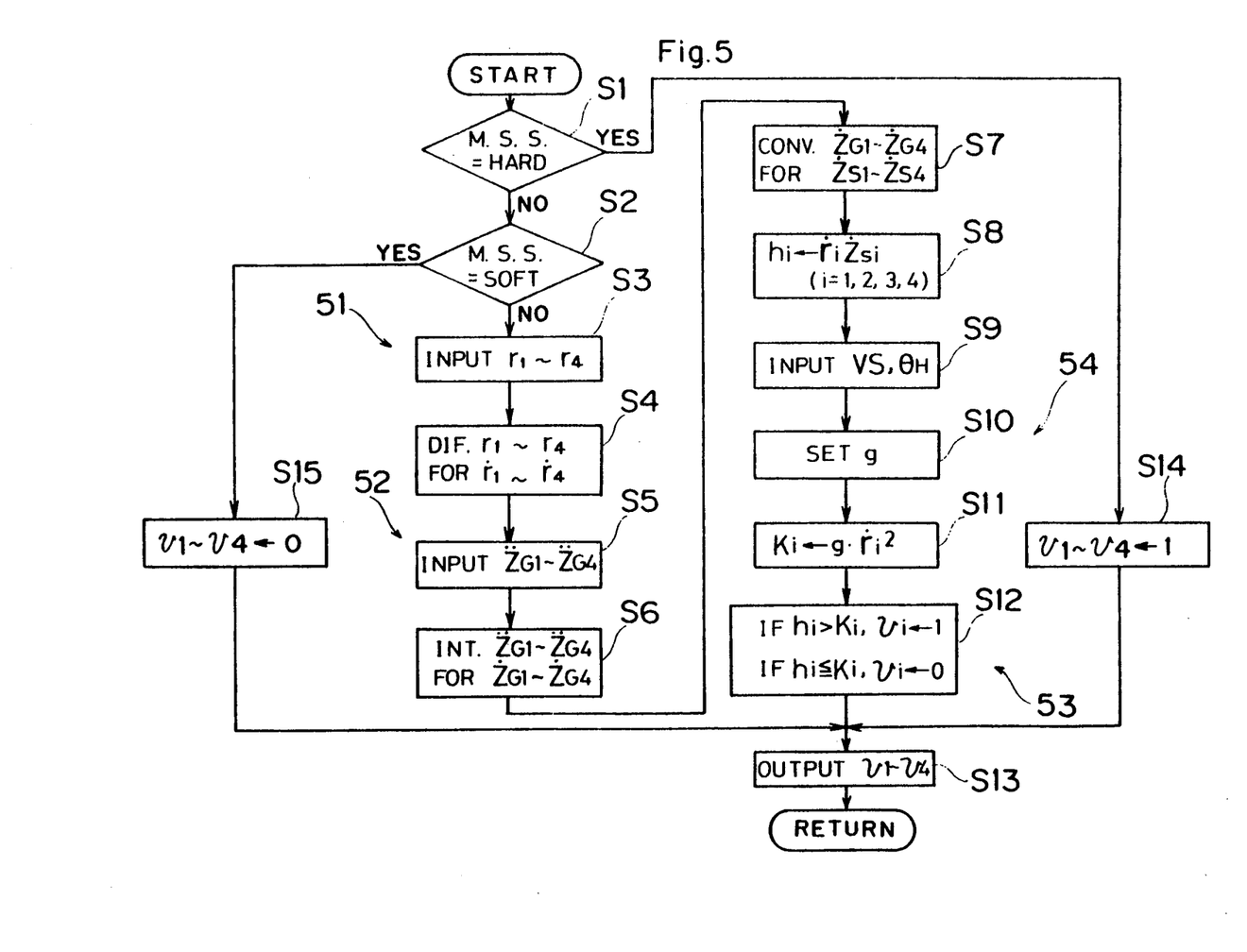
FIG. 5 is a flow chart illustrating control flow.

FIG. 5 shows a control flow of the control unit 8. This control is processed by the control program of the control unit 8. This control program is repeated in a given interval (1∼10 ms) by a starting program. The control is described below with the control flow.

First, at step S1, the mode selecting signal is checked whether it is HARD. If this judgement is YES, which means it is HARD, the all actuator control signals v1∼v4 are set [1] at step S14 and these control signals v1∼v4 are outputted at step S13. By this way, the damping force characteristic of all shock absorber 1∼4 is set HARD. The flow is finished here.

If the mode detecting signal is not HARD, it is checked whether the mode selecting signal is SOFT at step S2. If this judgement is YES, which means it is SOFT, the all actuator control signals v1∼v4 are set [0] at step S15 and this control signals v1∼v4 are outputted at step S13. By this way, the damping force characteristic of all shock absorbers 1∼4 is set SOFT. The flow is finished here.

If both judgement at steps S1, S2 are NO, which means the mode selecting signal is CONTROL, signals r1∼r4 of relative displacement between the sprung member and the unsprung member are inputted at step S3, then these signals r1∼r4 are differentiated by differentiation or so at step S4 in order to gain $\dot{r}1 \sim \dot{r}4$ which are signals of relative speed between the sprung member and the unsprung member. A relative speed detecting means 51 for detecting $\dot{r}1 \sim \dot{r}4$, the relative speed between the sprung member and the unsprung member (i.e., the difference between the absolute speed of the sprung member and the absolute speed of the unsprung member, $(\dot{z}s1-\dot{z}u1) \sim (\dot{z}s4-\dot{z}u4)$), is formed by the above steps S3, S4 and the vehicle height sensors 41∼44.

Next, after signals $\ddot{z}_G1 \sim \ddot{z}_G4$ which are the absolute acceleration of the sprung member are inputted at step S5, these $\ddot{z}_G1 \sim \ddot{z}_G4$ are integrated by integration or so at step S6 in order to gain the vertical absolute vehicle speed $\dot{z}_G1 \sim \dot{z}_G4$. Since these $\dot{z}_G1 \sim \dot{z}_G4$ are vertical absolute speed of the sprung member at the acceleration sensors 11∼14, they are converted to $\dot{z}s1 \sim \dot{z}s4$ which are vertical absolute speed of the sprung member at the shock absorbers 1∼4 at step S7. These $\dot{z}s1 \sim \dot{z}s4$ can be gained if three values of $\dot{z}_G1 \sim \dot{z}_G4$ are found, so $\dot{z}_G1 \sim \dot{z}_G3$ will be used and $\dot{z}_G4$ is a substitute. Here, as shown in FIG. 1, suppose a imaginary horizontal xy coordinate is provided. The coordinates for the acceleration sensors 11∼13 are expressed $(x_G1,y_G1) \sim (x_G3,y_G3)$ and the shock absorbers 1∼4 are expressed by $(xs1,ys1) \sim (xs4,ys4)$, then $\dot{z}s1 \sim \dot{z}s4$ are obtained by the following formula:

$$\begin{bmatrix} \dot{z}s1 \\ \dot{z}s2 \\ \dot{z}s3 \\ \dot{z}s4 \end{bmatrix} = \begin{bmatrix} 1 & ys1 & -xs1 \\ 1 & ys2 & -xs2 \\ 1 & ys3 & -xs3 \\ 1 & ys4 & -xs4 \end{bmatrix} \begin{bmatrix} 1 & y_G1 & -x_G1 \\ 1 & y_G2 & -x_G2 \\ 1 & y_G3 & -x_G3 \end{bmatrix}^{-1} \begin{bmatrix} \dot{z}_G1 \\ \dot{z}_G2 \\ \dot{z}_G3 \end{bmatrix}$$

where two efficient matrixes and a product of them are predetermined and given as a constant.

A sprung-member absolute speed detecting means 52 for detecting $\dot{z}s1 \sim \dot{z}s4$, the vertical absolute speed of the sprung member at the shock absorber 1∼4, is formed by the above steps S5∼S7 and the acceleration sensors 11∼14.

Thereafter, at step S8, the judging function hi is obtained by the following formula:

$hi = \dot{r}i \cdot \dot{z}si \ (i=1, 2, 3, 4)$

This judging function hi is a product which is $\dot{r}i$, the relative speed between the sprung member and the unsprung member, multiplied by $\dot{z}si$, the absolute speed of the sprung member, at each wheel.

Figure 6:
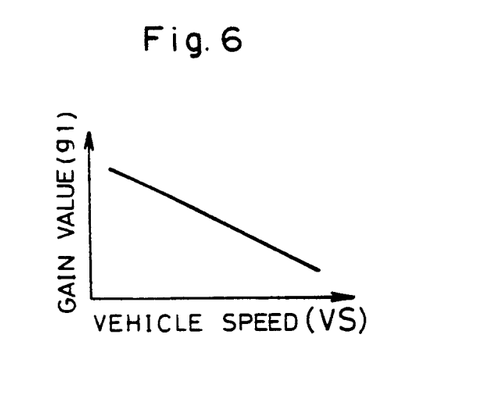
FIGS. 6 and 7 are maps illustrating relationships between gain value and vehicle speed and between gain value and steering angle respectively.
Figure 7:
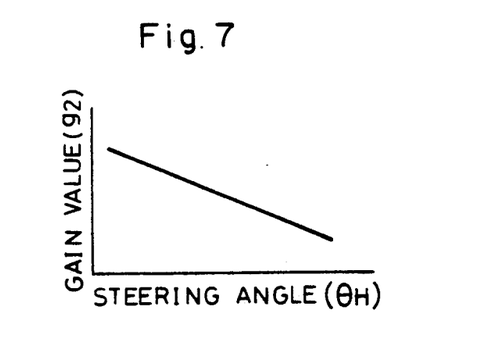

A vehicle speed signal VS and a steering angle signal $\theta$H are inputted at step S9 and gain value is set at step S10. The gain value is a product (g=g1·g2) which is a gain value g1 multiplied by a gain value g2, g1 is a gain value with respect to the vehicle speed and g2 is a gain value with respect to the steering angle and both gain values are obtained by the prememorized maps shown in FIGS. 6 and 7 respectively. The gain value g1 decreases while the vehicle speed increases and also the gain g2 decreases while the steering angle increases. At step S11, a predetermined value Ki ($=g \cdot \dot{r}i^2$) is set, Ki is the above gain value g multiplied by a square of $\dot{r}i$ of absolute speed between the sprung member and the unsprung member.

After setting the predetermined value Ki, at step S12, if the judging function hi obtained at step S8 is more than the predetermined value Ki (hi>Ki), then vi=1 and if hi is equal to or less than the predetermined value Ki (hi≦Ki), then vi=0. Thereafter, actuator control signals v1~v4 are outputted at step S13 and the flow is retured to the start. A control means 53, for calculating the judging function hi which is $\dot{r}i$, the relative speed between the sprung member and the unsprung member, multiplied by $\dot{z}si$, the absolute speed of the sprung member, and for switching the damping force characteristic of each shock absorber 1~4 to either HARD or SOFT according to whether hi is more than the predetermined value Ki, is formed by the above steps S8, S12, and S13. Also a predetermined value changing means 54 for changing the predetermined value Ki according to the driving condition and road surface. If the judging function hi is equal to the predetermined value Ki(hi=ki), the actuator control signal v1 can be kept in the prior state and accordingly the damping force characteristic is not changed.

According to the above control, if a driver selects the CONTROL mode and the judging function hi, which is $\dot{r}i$ ($=\dot{z}si-\dot{z}ui$), the relative speed between the sprung member and the unsprung member, multiplied by $\dot{z}si$, the absolute speed of the sprung member, is more than the predetermined value Ki (hi>Ki) (i.e., the damping force acts downwardly when the sprung member bounces upwardly and each shock absorber 1~4 stretches, or the damping force acts upwardly when the sprung member bounces downwardly and each shock absorber 1~4 is compressed), it is judged that the damping force generated by each shock absorber 1~4 acts in the oscillation-restraining direction with respect to the vertical oscillation of the sprung member, then the damping force characteristic of each shock absorbers 1~4 is changed to HARD. If the judging function hi is equal to or less than Ki (hi≦Ki) (the contradictory situation of the above), it is judged that the damping force generated by each shock absorber 1~4 acts in the oscillation-stimulating direction with respect to the vertical oscillation of the sprung member, then the damping force characteristic of each shock absorber 1~4 is changed to SOFT. By this way, the oscillation-restraining energy becomes larger than the oscillation-stimulating energy which is transmitted to the sprung member and accordingly, confortableness to ride in and running stability is improved.

The predetermined value Ki is a product ($=g \cdot \dot{r}i^2$) which is the gain value g multiplied by a square of $\dot{r}i$, the relative speed between the sprung member and the unsprung member, and therefore it becomes large in the high oscillation frequency range of the sprung member due to bounce and recession of a road. Thus, the damping force characteristic of each shock absorber 1~4 in the high oscillation frequency range is hardly changed to HARD, and noise and oscillation caused by unnecessary changing of the damping force characteristic can be prevented. Also, unsmooth feeling on the sprung member caused by the road bumps is restricted and comfortableness to ride in is improved.

Moreover, the predetermined value changing means 54, for changing the predetermined value Ki according to the road bumps and the oscillation caused by it, doesn't need a detecting means for detecting the road surface or vehicle oscillation range. Therefore, the present embodiment possesses an advantage such as lesser cost.

Furthermore, since the gain value g for setting the predetermined value Ki is a product which is the gain value g1 multiplied by the gain value g2, both g1 and g2 decrease while the vehicle speed increases and while the steering angle increases respectively, the damping force characteristic is set HARD during high speed driving and high speed cornering where the high vehicle stability is required. Therefore the securing the stableness can be planned.

Figure 8:
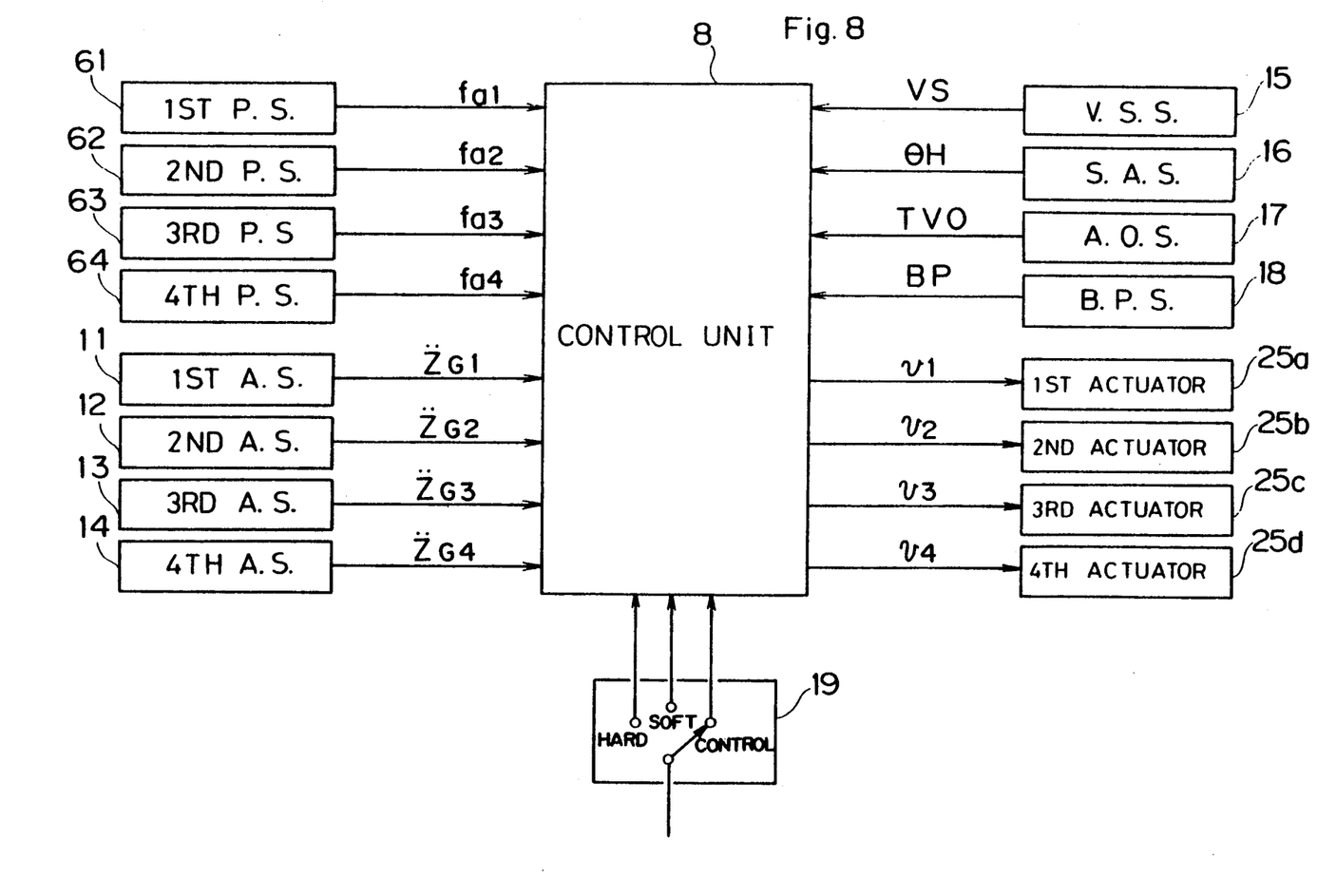
FIGS. 8 and 9 show a second embodiment, of which
FIG. 8 corresponds to FIG. 4,
FIG. 9 corresponds to FIG. 5.
Figure 9:
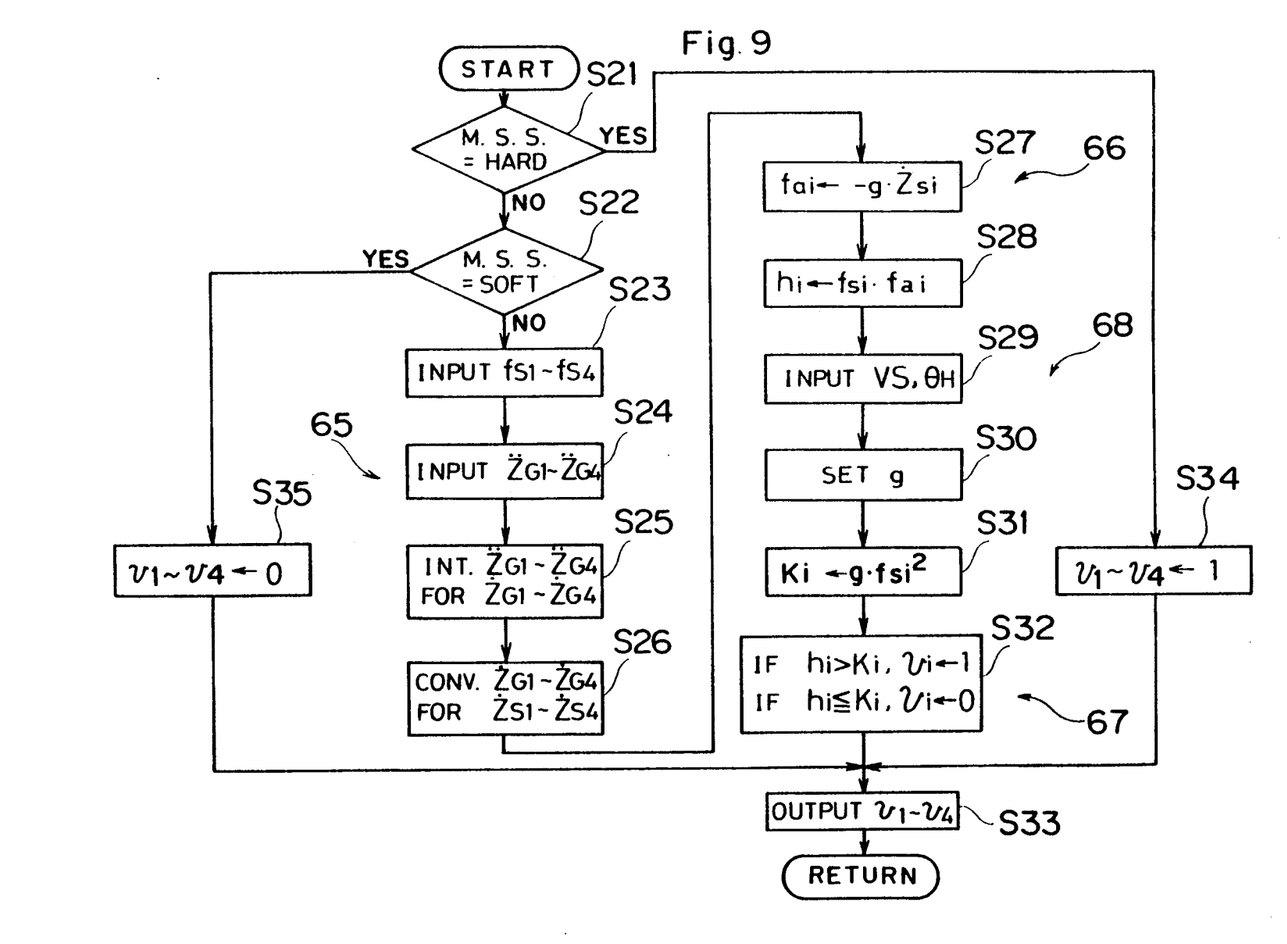

FIGS. 8 and 9 show the second embodiment. FIG. 8 is a block diagram illustrating a control part of the suspension system. The different point of the second embodiment from the first embodiment (refer to FIG. 4) is that the second embodiment possesses a first~forth pressure sensors 61~64 as damping force detecting means for detecting the damping force of each shock absorber 1~4 (refer to FIG. 1) instead of the first~-forth vehicle height sensors 41~44 for detecting the relative displacement between the sprung member and the unsprung member for each wheel. Damping force signals fa1-fa4 are outputted from those pressure sensors 61~64 to the control unit 8. These signals take continuous numbers and they are positive if the damping force acts upwardly and they are negative if the damping force acts downwardly. Since the other parts are identical with the first embodiment, the same numbers are used for this second embodiment to avoid repetition.

FIG. 9 shows the control flow of the control unit 8. This control is processed by the control program of the control unit 8 and repeated in a given interval (1~10 ms) by the starting program. The control is described below with the control flow.

First, it is checked whether the mode selecting signal is HARD at step S21. If this judgement is YES, which means the mode selecting signal is HARD, all actuator control signals v1~v4 are set [1] at step S34 and the control signals v1~v4 are outputted at step S33. By this way, the damping force characteristic of all shock absorbers 1~4 are set HARD and the process is finished here.

If the mode selecting signal is not HARD, it is checked whether the mode selecting signal is SOFT at the following step S22. If this judgement is YES, which means the mode selecting signal is SOFT, all the actuator control signals v1~v4 are set [0] at step S35 and control signals v1~v4 are outputted at step S33. By this way, the damping force characteristic of all shock absorbers 1~4 is SOFT. The flow is finished here.

If both judgements at steps S21 and S22 are NO, which means the mode selecting signal is CONTROL, the damping force signals fa1-fa4 are inputted a step S23 and signals $\ddot{z}_G 1 \sim \ddot{z}_G 4$ of the absolute speed of the sprung member are inputted at step S24. Thereafter, vertical vehicle absolute speed $\dot{z}_G 1 \sim \dot{z}_G 4$ are obtained by integrating $\ddot{z}_G 1 \sim \ddot{z}_G 4$ by integration or so at step S25. Since $\dot{z}_G 1 \sim \dot{z}_G 4$ are vertical absolute speed of the sprung member at the acceleration sensors 11~14, they are converted to $\dot{z}s1 \sim \dot{z}s4$ which are vertical absolute speed of the sprung member at the shock absorbers 1~4 at steps S26. The description of the above conversion is already made in the first embodiment and it is not repeated here. A sprung-member absolute speed detecting means 65 for detecting each żs1~żs4 which are vertical absolutely speed of the sprung member at each shock absorber 1~4 is formed by the above steps S24~S26 and the acceleration sensors 11~14.

Next, a sky hook damper force fai as an ideal damping force is obtained at step S27 by the following formula:

$$fai = -g \cdot \dot{z}si \ (i=1, 2, 3, 4)$$

In short, the sky hook damper force fai is a negative value of the product which is żsi, the absolute speed of the sprung member for each wheel, multiplied by the gain value g. A sky hook damper force calculating means 66 for calculating the sky hook damper force fai is constructed by this step S27.

After calculating the sky hook damper force fai, the judging function hi(=fsi·fai), which is the sky hook damper force fai multiplied by an actual damping force fsi, is obtained at step S28. At the following step S29, a vehicle speed signal VS and a steering angle θH are inputted, then a gain value g is set at step S30. As described in the first embodiment, the gain value g which is the gain value g1 multiplied by the gain value g2, g1 is a gain value with respect to the vehicle speed and g2 is a gain value with respect to the steering angle, is set by the premorized maps shown in FIGS. 6 and 7. Also, the predetermined value Ki(=g·fsi$^2$) for each wheel is set at step S31, which Ki is the gain value g multiplied by a square of ṙi, relative speed between the sprung member and the unsprung member.

At step S32, if the judging function hi obtained at step S28 is more than the predetermined value Ki (hi>Ki), then vi=1 and if the judging function hi is equal to or less than Ki (hi≦Ki), then vi=0. At the following step S33, actuator control signals v1~v4 are outputted and the flow is returned to the start. A control means 67 for calculating the judging function hi, which is the sky hook damper force fai multiplied by the actual damping force fsi, and for changing the damping force characteristics of each shock absorber 1~4 to HARD or SOFT according to whether the judging function hi is more than the predetermined value Ki is formed by the steps S28, S32, and S33. Also, a control means 68 for changing the predetermined value Ki according to the driving status and the road surface is formed by the steps S29~S31. If the judging function hi is equal to the predetermined value Ki (hi=Ki), the actuator control signal vi can be kept in the prior state and the damping force may not be changed.

According to the above control, as the first embodiment, if a driver selects CONTROL mode and the judging function hi (fsi·fai), which is the sky hook damper force fai (= -g·żsi) multiplied by the actual damping force fsi of each shock absorber 1~4, is more than the predetermined value Ki (hi>Ki), i.e., the damping force generated by each shock absorber 1~4 acts on oscillation-restraining direction with respect to the vertical oscillation of the sprung member, the damping force characteristic of each shock absorber 1~4 is changed to HARD. If the judging function hi is equal to or less than Ki (hi≦Ki), i.e., the damping force generated by each shock absorber 1~4 acts on the oscillation-stimulating direction with respect to the vertical oscillation of the sprung member, the damping force characteristic of each shock absorber 1~4 is changed to SOFT. Thus, the oscillation-restraining energy becomes larger than the oscillation-stimulating energy transmitted to the sprung member and accordingly, comfortableness to ride in and running stability can be improved.

Since the predetermined value Ki (=g·fsi$^2$) which is the gain value g multiplied by a square of shock absorber damping force fsi is large in the range of high oscillation frequency of the sprung member due to bounce and recession of a road, the damping force of each shock absorber 1~4 is hardly changed to HARD. Thus, noise and oscillation caused by unnecessary changes of the damping force can be prevented and unsmooth feeling on the sprung member caused by road bumps are restricted. Consequently, improvement of comfortableness to ride in can be planned.

This second embodiment doesn't need a detecting means for detecting road surface or vehicle oscillation range as in the case of the first embodiment, resulting in possessing advantage such as lesser cost. Also, the damping force characteristic is HARD during high speed driving at high speed cornering and therefore, the securing the running stability can be planned.

Figure 10:
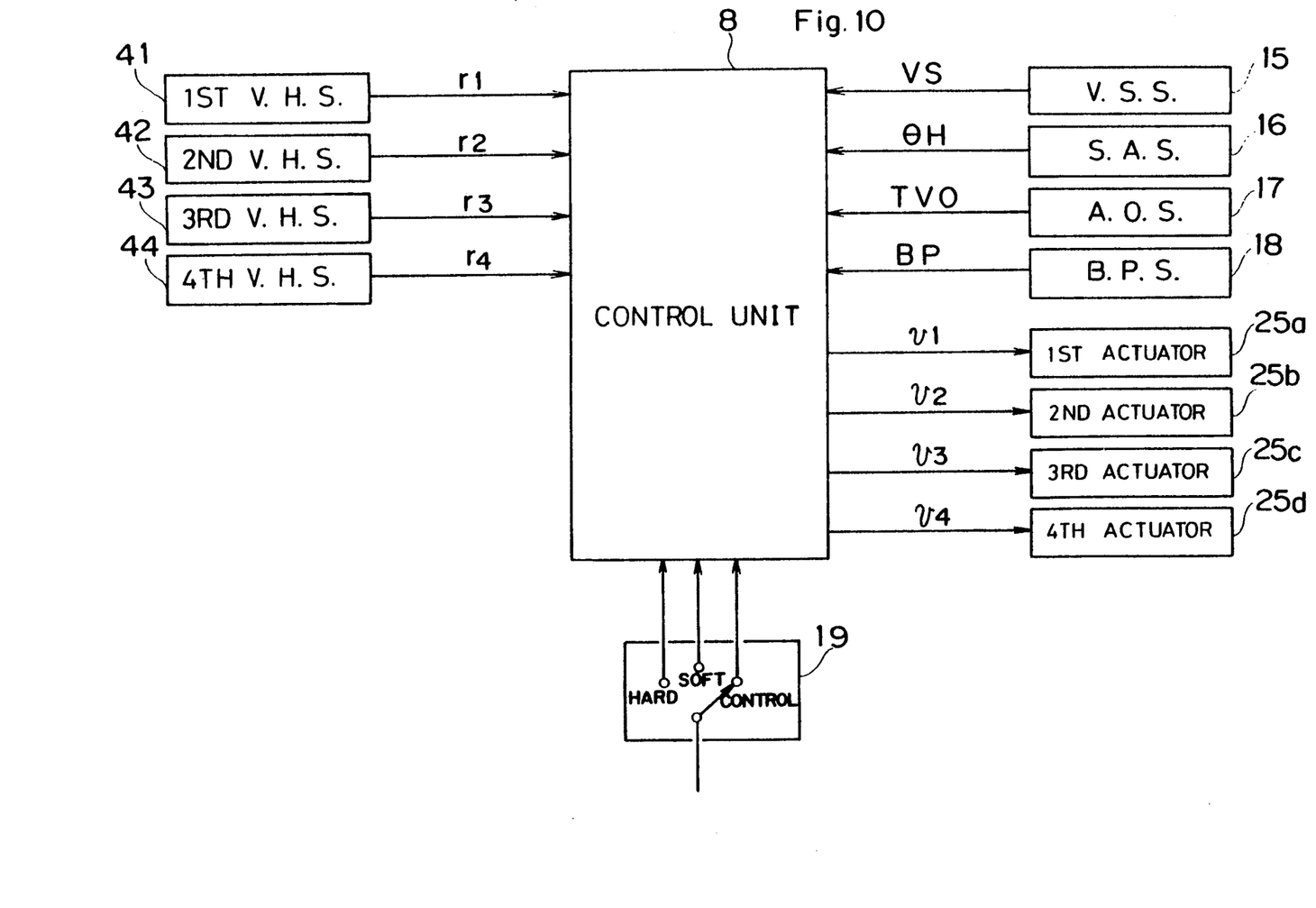
FIGS. 10 and 11 show a third embodiment, of which
FIG. 10 corresponds to FIG. 4,
FIG. 11 corresponds to FIG. 5.
Figure 11:
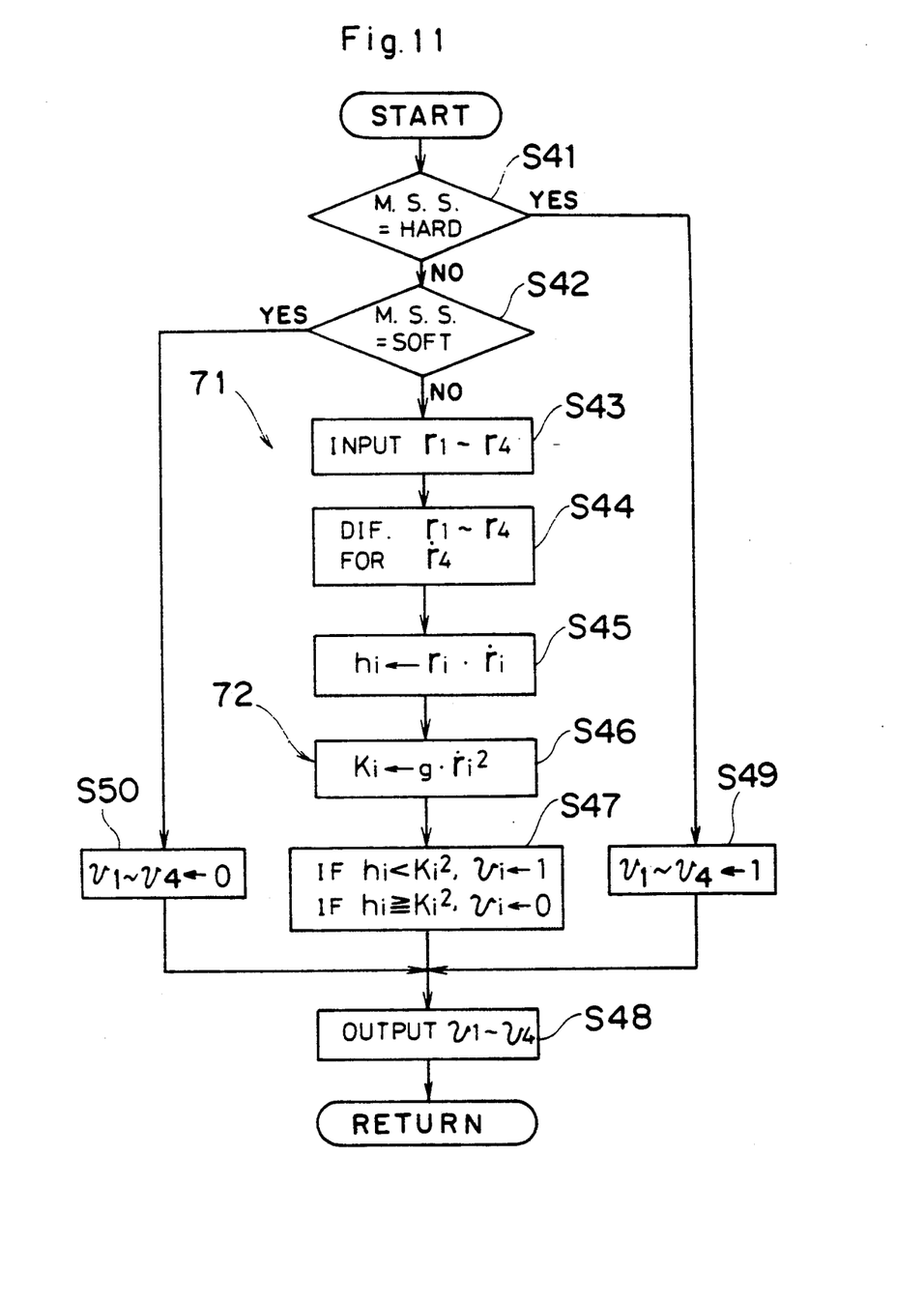

FIGS. 10 and 11 show the third embodiment. FIG. 10 is a block diagram illustrating a control part of the suspension system. The different point of the third embodiment from the first embodiment (refer to FIG. 4) is that the third embodiment does not possess the first~forth acceleration sensors 11~14 for detecting the vertical acceleration of the sprung member for each wheel. Since the other parts are identical with the first embodiment, the same numbers are used for this second embodiment to avoid repetition.

FIG. 11 shows the control flow of the control unit 8. This control is processed by the control program of the control unit 8 and repeated in a given interval (1~10 ms) by the starting program. The control is described below with the control flow.

First, it is checked whether the mode selecting signal is HARD at step S41. If this judgement is YES, which means the mode selecting signal is HARD, all actuator control signals v1~v4 are set [1] at step S49 and the control signals v1~v4 are outputted at step S48. By this way, damping force characteristic of all shock absorbers 1~4 is set HARD and the process is finished here.

If the mode selecting signal is not HARD, it is checked whether the mode selecting signal is soft at the following step S42. If this judgement is YES, which means the mode selecting signal is soft, all the actuator control signals v1~v4 are set [0] at step S50 and control signals v1~v4 are outputted at step S48. By this way, the damping force characteristic of all shock absorber 1~4 is set SOFT. The flow is finished here.

In both judgements at steps S41 and S42 are NO, which means the mode selecting signal is CONTROL, signals r1~r4 of relative displacement between the sprung member and the unsprung member are inputted at step S43 and ṙ1~ṙ4 of relative speed between the sprung member and the unsprung member are obtained by differentiating r1~r4 by differentiation or so at step S44.

Next, the judging function hi is obtained by the following formula:

$$hi = ri \cdot \dot{r}i \ (i=1, 2, 3, 4)$$

In short, the judging function hi is a product which is ri, the relative displacement between the sprung member and the unsprung member, multiplied by r̈i, the relative speed of it.

Also, the predetermined value Ki($=g \cdot \dot{r}i^2$) is set at step S46, which Ki is the gain g multiplied by square of r̈i, the relative speed between the sprung member and the unsprung member. The gain value g may be positive or negative and it also can be obtained by multiplying the gain value g1, which is a gain value with respect to the vehicle speed, by the gain value 2, which is a gain value with respect to the steering angle, by using the prememorized map shown in FIGS. 6 and 7 as in the case of the first embodiment.

After the predetermined value Ki is set, at step S47, if the judging function hi obtained at step S45 is more than the predetermined value Ki (hi>Ki), then vi=1 and if the judging function hi is equal to or less than Ki (hi≦Ki), then vi=0. At the following step S48, actuator control signals v1~v4 are outputted and the flow is returned to the start. A control means 71 for calculating the judging function hi, which is the relative displacement between the sprung member and the unsprung member multiplied by the relative speed between the sprung member and the unsprung member, and for changing the damping force characteristic of each shock absorber 1~4 to HARD or SOFT according to whether the function hi is more than the predetermined value Ki is formed by the steps S43~45, and S47. Also, a control means 72 for changing the predetermined value Ki according to the driving condition and the road surface is formed by the step S6. If the judging function hi is equal to the predetermined value Ki (hi=Ki), the actuator control signal vi can be kept in the prior state and the damping force may not be changed.

According to the above control, if a driver selects CONTROL mode and the judging function hi, which is ri (=zsi−zui), the relative displacement between the sprung member and the unsprung member, multiplied by r̈i (=żsi−żui), the relative speed between the sprung member and the unsprung member, is equal to or less than the predetermined value Ki (hi>Ki)(i.e., the shock absorbers 1~4 are stretched and the damping force acts on compressing direction, or the shock absorbers 1~4 are compressed and the damping force acts on stretching direction), the damping force generated by each shock absorber 1~4 is judged that it is acting on the oscillation-restraining direction with respect to the vertical oscillation of the sprung member and the damping force characteristic of the shock absorbers are changed to HARD. If the judging unction hi is more than the predetermined value Ki (hi>Ki) (i.e., the shock absorber 1~4 are stretched and the damping force acts in the stretching direction, or the shock 1~4 are compressed and the damping force acts in the compressing direction) the damping force of each shock absorber 1~4 is judged that it is acting in the oscillation-stimulating direction with respect to the vertical oscillation of the sprung member and the damping force characteristic is changed to SOFT. Thus, the oscillation-restraining energy becomes larger than the oscillation-stimulating energy transmitted to the sprung member and accordingly, comfortableness to ride in and running stability can be improved.

The predetermined value Ki ($=g \cdot \dot{r}i^2$) is the gain value g multiplied by a square of r̈i, the relative speed between the sprung member and the unsprung member, and it is large in the range of the high oscillation frequency of the sprung member due to the bounce and recession of a road. Therefore, the damping force characteristic of each shock absorber 1~4 is hardly changed to HARD in the high oscillation frequency range of the sprung member, particularly when the gain value is set negative. Thus, noise and oscillation caused by unnecessary changes of the damping force characteristic can be prevented and unsmooth feeling on the sprung member caused by road bumps are restricted. Consequently, improvement of comfortableness to ride in can be planned. When the gain value is set positive, the damping force characteristic of each shock absorber 1~4 is hardly changed to SOFT on the high oscillation range.

In this third embodiment, the predetermined value changing means 52 for changing the predetermined value Ki according to both road variation and vehicle oscillation range changed by it doesn't need a detecting means for detecting road surface to vehicle oscillation range, resulting in possessing advantage such as lesser cost.

Although the present invention has been shown and described in terms of the preferred embodiment thereof, it should not be considered as being particularly limited thereby. The details of any particular embodiment could be varied. For example, in the first embodiment, the damping force characteristic of each shock absorber 1~4 is changed to HARD or SOFT according to whether the product which is żs, the absolute speed of the sprung member, multiplied by ṙ($=\dot{z}s - \dot{z}u$), the relative speed between the sprung member and the unsprung member, is more than the predetermined value Ki (for example, $g \cdot (\dot{z}s - \dot{z}u)^2$, the given value g multiplied by the square of the relative speed between the sprung member and the unsprung member). However, the damping force characteristic of each shock absorber 1~4 can be changed to HARD or SOFT according to a product which is żu, the absolute speed of the unsprung member, multiplied by ṙ($=\dot{z}s - \dot{z}u$), the relative speed between the sprung member and the unsprung member, is more than the predetermined value Ki ($G \cdot (\dot{z}s - \dot{z}u)^2$, the gain value G multiplied by the square of the relative speed between the sprung member and unsprung member). This is because F1 is equal to F2. The F1 is a difference between the predetermined value Ki ($=g \cdot (\dot{z}s - \dot{z}u)_2$) and the product which is żs, the absolute speed of the sprung member, multiplied by ṙ($=\dot{z}s - \dot{z}u$), the relative speed between the sprung member and the unsprung member. The F2 is a difference between the predetermined value Ki($=G \cdot (\dot{z}s - \dot{z}u)^2$) and a product which is zu, the absolute speed of the unsprung member, multiplied by ṙ($=\dot{z}S - \dot{z}U$), the relative speed between the sprung member and the unsprung member. Those difference F1, F2 can be shown by the following equation:

$$F1 = \dot{z}s(\dot{z}s - \dot{z}u) - g(\dot{z}s - \dot{z}u)^2$$
$$= (\dot{z}s - \dot{z}u)\{\dot{z}s - g(\dot{z}s - \dot{z}u)\}$$
$$= (\dot{z}s - \dot{z}u)\{(1 - g)\dot{z}s + g\dot{z}u\}$$

$$F2 = \dot{z}u(\dot{z}s - \dot{z}u) - G(\dot{z}s - \dot{z}u)^2$$
$$= (\dot{z}s - \dot{z}u)\{\dot{z}u - G(\dot{z}s - \dot{z}u)\}$$
$$= (\dot{z}s - \dot{z}u)\{-G\dot{z}s + (1 + G)\dot{z}u\}$$

This is followed by

F1=F2 where $1-g=-G$, $g=1+G$

Also, although the damping force characteristic of each shock absorber 1~4 of damping force characteristic variable type interposed between the sprung member and the unsprung member for each wheel are changed independently, right and left of shock absorber 2, 1 for front wheels are controlled to have the same damping force and shock absorbers 3, 4 for rear wheels are controlled to have the same damping force. In this case, the damping force characteristic of the shock absorbers 2, 1 for right and left front wheels are changed to HARD or SOFT according to the total of the products. One product is $\dot{z}s1$, the absolute speed in the sprung member of left front wheel, multiplied by $(\dot{z}s1-\dot{z}u1)$, the relative speed between the sprung member and the unsprung member of the left front wheel, and another product is $\dot{z}s2$, the absolute speed of the sprung member of the right front wheel, multiplied by $(\dot{z}s2-\dot{z}u2)$, the relative speed between the sprung member and the unsprung member, is more than the predetermined value.

We claim:

1. A suspension system for a vehicle comprising:
   a shock absorber, having a variable damping force characteristic, provided between a sprung member and an unsprung member;
   a judging means for judging in which direction damping force of said shock absorber is acting with respect to vertical oscillation of said sprung member, either in oscillation-stimulating direction or in oscillation-restraining direction and for judging size of the damping force;
   a control means for controlling the damping force characteristic in such a way that if a judging function is more than a predetermined value, the damping force characteristic is set higher and if the judging function is less than the predetermined value, the damping force characteristic is set lower;
   a predetermined value changing means for changing a predetermined value according to road surface;
   an absolute speed detecting means for detecting absolute speed of either said sprung member or said unsprung member;
   a relative speed detecting means for detecting relative speed between said sprung member and said unsprung member; and
   said judging means receives signals from said absolute speed detecting means and said relative speed detecting means and calculates a product which is the absolute speed of either said sprung member or of said unsprung member, multiplied by the relative speed between the sprung member and the unsprung member in order to judge in which direction the damping force of said shock absorber is acting, either in oscillation-stimulating direction or in oscillation-restraining direction, and to judge size of the damping force.

2. A suspension system as claimed in claim 1, wherein said predetermined value changing means sets the predetermined value by multiplying a square of the relative speed between said sprung member and said unsprung member, detected by said relative speed detecting means, times a gain value.

3. A suspension system as claimed in claim 2, wherein said gain value of the function decreases while vehicle speed increases.

4. A suspension system as claimed in claim 2, wherein said gain value of the function decreases while steering angle increases.

5. A suspension system as claimed in claim 1, wherein said shock absorber comprises:
   a cylinder;
   a piston unit slidably disposed inside of said sylinder; and
   two orifices formed in said piston unit, one of said orifices is open at all times and another orifice is openable or closable by an actuator, damping force characteristic of said shock absorber is variable to higher level or lower level by opening or closing thereof.

6. A suspension system as claimed in claim 5, wherein said actuator is electromagnet, and the damping force characteristic of said shock absorber is set higher when said actuator is not electrified.

7. A suspension system as claimed in claim 1, wherein said shock absorber is provided for each of four vehicle wheels and comprises a mode selecting switch for selecting mode from HARD, SOFT, and CONTROL, the damping force characteristic of all said shock absorbers is set higher when HIGH mode is selected, the damping force characteristic of all said shock absorber is set lower when SOFT mode is selected, the damping force characteristic of each said shock absorber is set variable automatically and independently to each other when the CONTROL mode is selected.

8. A suspension system as claimed in claim 1, wherein said absolute speed detecting means for detecting absolute speed of either said sprung member or said unsprung member comprises an acceleration sensor provided near said shock absorber and integrates vertical acceleration of either said sprung member or said unsprung member whichever detected by said acceleration sensor and converts the absolute speed of said sprung member or said unsprung member gained by that integration to absolute speed of said sprung or said unsprung member at said shock absorber.

* * * * *